United States Patent

Wunning

[11] Patent Number: 5,833,450
[45] Date of Patent: Nov. 10, 1998

[54] RECUPERATOR AND RECUPERATOR BURNER

[75] Inventor: Joachim Wunning, Leonberg, Germany

[73] Assignee: WS Wärmeprozesstechnik GmbH, Renningen, Germany

[21] Appl. No.: 748,126

[22] Filed: Nov. 12, 1996

[30] Foreign Application Priority Data

Nov. 10, 1995 [DE] Germany ................. 195 41 922.7

[51] Int. Cl.⁶ ............................. F28F 13/02; F28F 1/42; F23D 11/44
[52] U.S. Cl. ........................ 431/215; 431/11; 126/91 A; 165/DIG. 515; 165/109.1; 165/133; 165/179
[58] Field of Search ................... 431/11, 215; 165/522, 165/517, 520, 515, 529; 126/91 A

[56] References Cited

U.S. PATENT DOCUMENTS 4,298,333  11/1981  Wunning ............................. 431/215
5,326,255   7/1994  Wunning ............................. 431/215
5,577,555  11/1996  Hisajima et al. ............. 165/DIG. 515

FOREIGN PATENT DOCUMENTS 40 11 190 A1   10/1991   Germany .

*Primary Examiner*—Carl D. Price
*Attorney, Agent, or Firm*—Frishauf, Holtz, Goodman, Langer & Chick, P.C.

[57] ABSTRACT

A ceramic recuperator (18) for a recuperator burner (1) is provided, in its heat exchanger region, with a plurality of radially inward- and outward-extending teeth. On the otherwise hollow-cylindrical recuperator (18), the teeth (19) are arranged in groups, e.g., in rings; the teeth of one ring are each offset from the teeth of an adjacent ring. Alternatively, it is possible to arrange the teeth on a single- or multi-start helical line. The recuperator can be produced economically by the slip-casting method.

9 Claims, 2 Drawing Sheets

RECUPERATOR AND RECUPERATOR BURNER

FIELD OF THE INVENTION

The invention relates to a recuperator for a recuperator burner with improved heat transfer, in which the recuperator has a ceramic tube segment, the wall of which is provided with protrusions and indentations.

Recuperator burners are burners with a combustion chamber, to which a recuperator is associated along which combustion gases and combustion air flow in countercurrent. The combustion air is thereby preheated.

There is a trend in the development of recuperator burners to making the recuperator out of ceramic material.

BACKGROUND

From German Patent Disclosure DE 40 11 190 A1, a ceramic recuperator is known that has a ceramic middle tube that has corrugations extending in the longitudinal direction. A combustion chamber is supplied with combustion air via corresponding radial passages that lead within air guide conduits defined between the middle tube and an inner tube. Fuel is supplied via a central tube that is located concentrically within the inner tube.

THE INVENTION

It is an object of the invention to provide a ceramic recuperator that can be made by the slip-casting process and that has good heat transfer between the combustion air and combustion gases.

Briefly, the protrusions are formed as radially oriented hollow teeth. A plurality of such teeth are provided in the longitudinal direction of the recuperator. The tooth height N to be measured in the radial direction for a given wall thickness S is in a range of from 0.8 to 4 times the wall thickness. The tooth length l to be measured in the longitudinal direction of the tube segment is in a range of from 4 to 40 times the wall thickness S; and the angle formed by two adjacent teeth is in a range from 75° to 125°.

To divide the combustion gases from the inflowing combustion air, the ceramic recuperator has a tubular portion on which the radial teeth are formed. They increase the surface area of the recuperator and improve the heat transfer from the combustion gas to the combustion air. By means of the teeth, the flow boundary layer is torn open again and again, both on the outside of the recuperator and on its inside, which substantially increases the heat transfer compared with smooth surfaces. The teeth thus make a targeted influence on the resulting gas streams possible. Only the outer contour is fixed upon production by the slip-casting process. The inner contour is slightly rounded. The dimensions given assure good influence on the gas stream on the inside.

The teeth are preferably hip-roof-shaped protrusions, with their ridge extending longitudinally. In the circumferential direction, they each form a ring around the tube segment. In the axial direction, a plurality of such rings follow one another.

The indicated ranges for the tooth height N, the tooth length l and for the angle formed by adjacent teeth assure that the recuperator can be made economically by the slip-casting method and is mechanically sturdy.

Advantageously, successive teeth in the longitudinal direction of the recuperator are offset from one another circumferentially. The offset may be either one-half the width of a tooth or some other size. The teeth are located on more or less steeply sloping helical lines, as a result of which an intensive thermal contact is attained between the combustion gas, the combustion air and the recuperator.

On the end, a combustion chamber integrally embodied with the remainder of the tube segment may be provided on the recuperator. This results in a simple, sturdy design. The wall of the combustion chamber is smooth. The combustion chamber may be formed on the recuperator without additional effort or expense upon production by the slip-casting method.

As the ceramic material, an SiC ceramic is especially suitable; it has appropriate heat resistance and thermal conductivity.

A recuperator with the characteristics described above has a heat transfer performance that is near the value of a steel finned recuperator. Compared with the known ceramic recuperator having a corrugated tube, the heat transfer performance is approximately double. A recuperator burner which uses the above-described recuperator offers corresponding advantages.

DRAWINGS

In the drawing, one exemplary embodiment of the invention is shown. Shown are:

FIG. 1, a recuperator burner with a ceramic recuperator, in a schematic longitudinal section;

FIG. 2, the recuperator burner of FIG. 1 in a simplified cross-sectional view; and FIG. 3, the ceramic recuperator of FIGS. 1 and 2, in a schematic side view.

DETAILED DESCRIPTION

Figure 1:
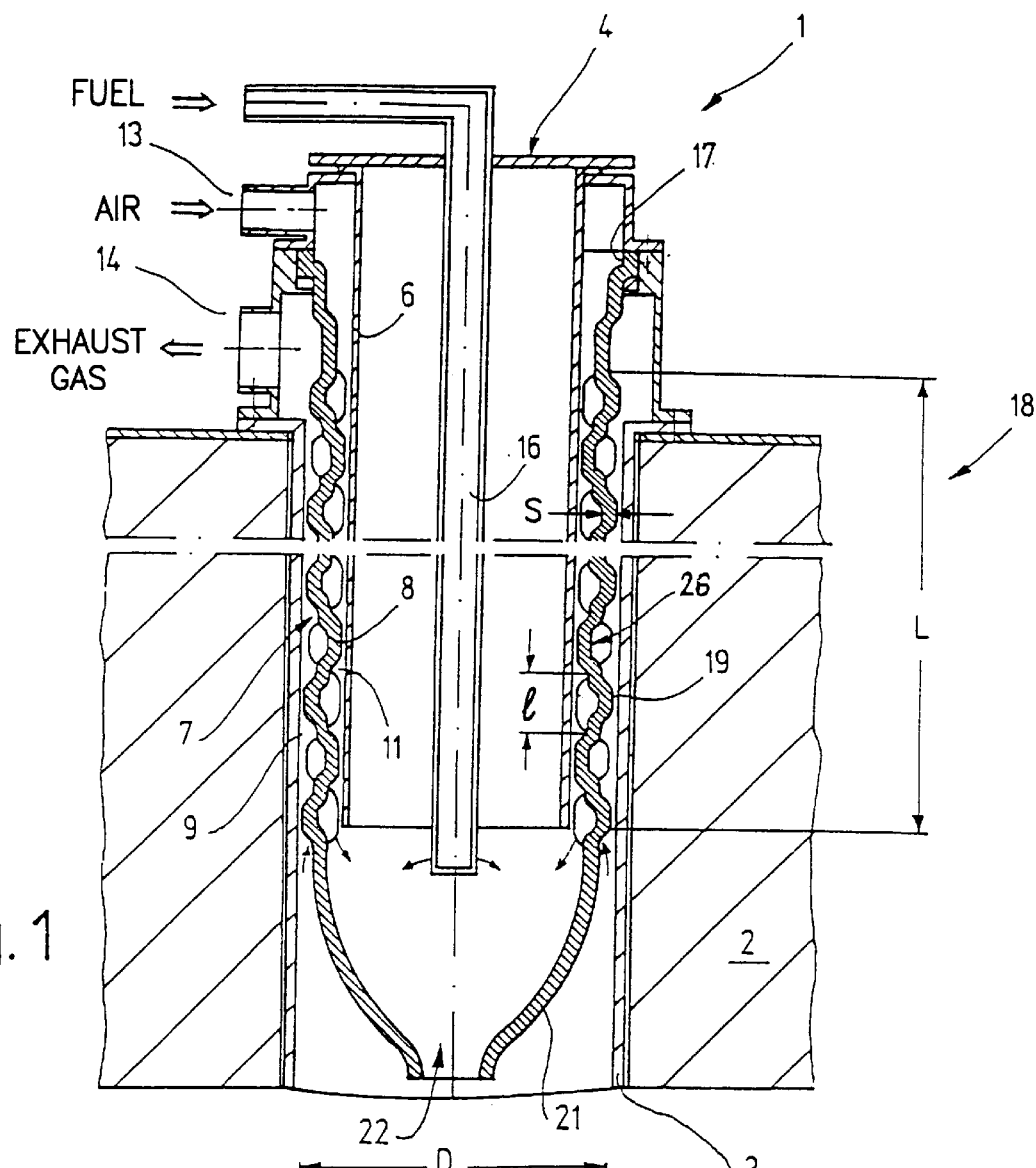

FIG. 1 shows a recuperator burner 1, which is mounted at an opening of a furnace wall 2 for heating a furnace chamber. Seated in the opening is an exhaust gas guide tube 3. A closed exhaust gas guide tube may also be used for indirect heating of the oven chamber.

The recuperator burner 1 includes an air guide cylinder 6, which begins at a burner head 4 and is kept substantially coaxial with the exhaust gas guide and heat radiating tube 3. An annular chamber 7 defined between the exhaust gas guide tube 3 and the air guide cylinder 6 is subdivided by a ceramic recuperator 8 of SiC ceramic into an outer chamber 9 and an inner chamber 11. While the inner chamber 11 communicates with an air supply connection 13 provided on the burner head 4, the outer chamber 9 communicates with an exhaust gas connection 14. A fuel tube 16 provided on the burner head 4 extends coaxially through the air guide cylinder.

Figure 2:
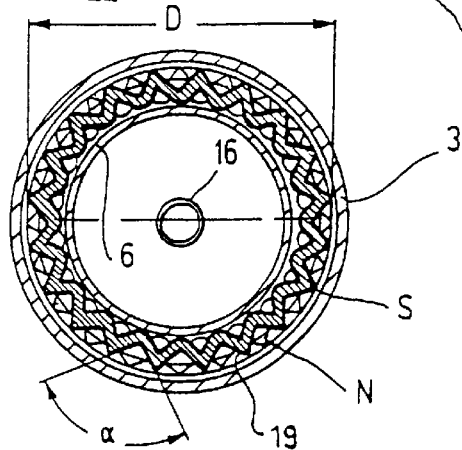
Figure 3:
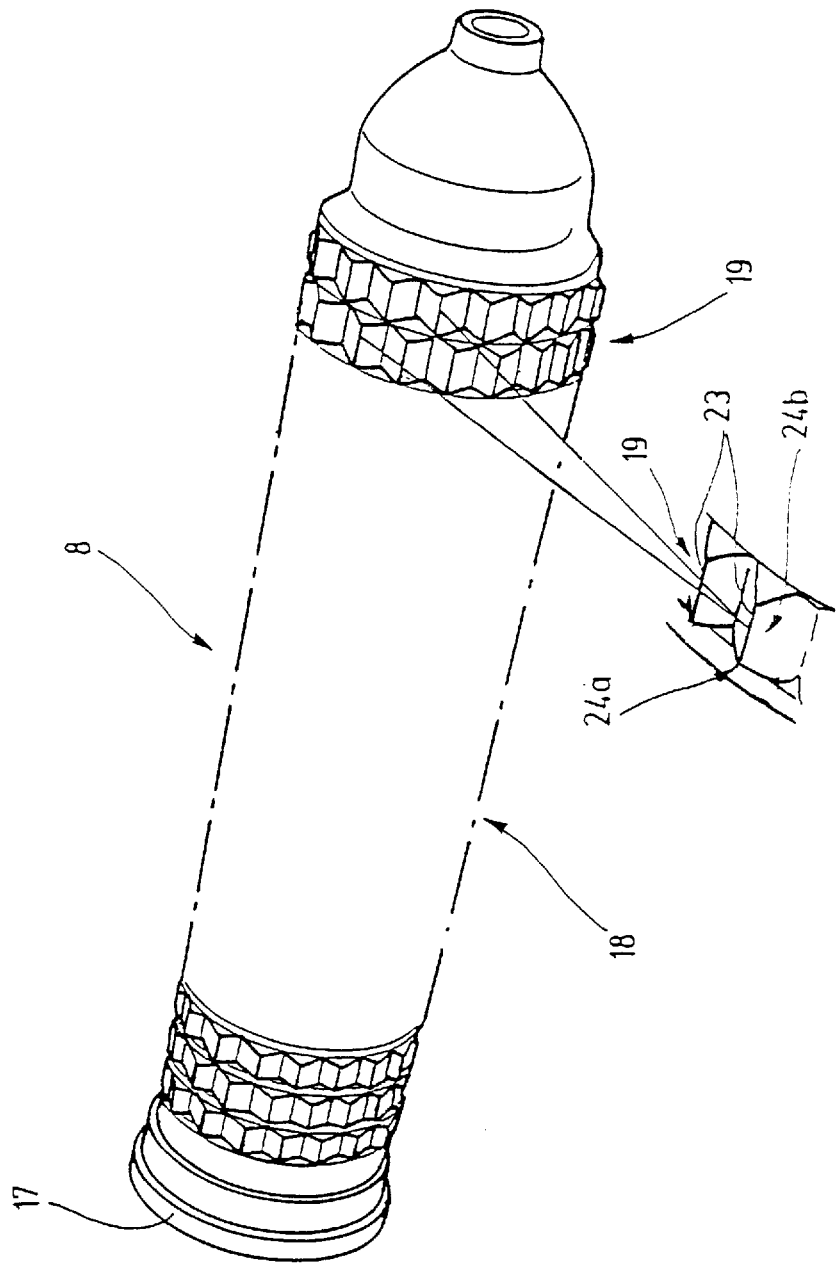

The recuperator 8, mounted by one end to the burner head 4 at flange 17, is shown separately in FIG. 2 and 3. Adjoining the flange 17, it has a tube segment 18 with a length L and a plurality of individual teeth 19. The tube segment 18, which has a substantially constant diameter, is adjoined on its other end by a combustion chamber 21, which on its face end, with an opening 22, defines an outflow nozzle.

The recuperator 8 and in particular the tube segment 18 is formed with substantially constant wall thickness, and as a result both its inside surface, defining the inner chamber 11, and its outside surface defining the outer chamber 9 are each indented. The teeth 19 are arranged annular in close succession along the circumference of the recuperator 8 (FIG. 3). Each of the teeth 19 is hollow and has two radially inclined side faces 24a, 24b, joined together by an axial ridge 23. Axially, the tooth 19 is defined by inclined triangular faces.

Between the teeth 19, indentations 26 are provided, which correspond in their shape to a tooth 19 but extend radially inward and thus to a certain extent represent a negative copy of a tooth 19.

The length l of a tooth 19 (its maximum extent in the axial direction) is dependent on the wall thickness S; it is in a range of from 4 to 40 times the wall thickness S of the tube segment 18. The tooth height, which is the difference between the least inside diameter of the tube segment 18 and the greatest outer diameter of this tooth segment 18, is in a range of from 0.8 to 4 times the wall thickness S. The angle of a side face 24 from the radial is between 37.5° and 62.5°.

The teeth 19 of successive axial positions are offset from one another in the circumferential direction. The offset is one-half of a tooth width, so that the teeth of successive rings of teeth each face a respective gap.

The recuperator 8 is made by the slip-casting method. The dimensions given for the recuperator and the tube segment 18 assure highly feasible manufacture and produce a good heat transfer performance on the part of the recuperator 8. In the slip-casting method, a flowable ceramic composition is placed in a suitable hollow mold. After water has been partially extracted, the molded blank is removed from the mold, dried, and fired.

OPERATION

During operation, combustion air flows into the combustion chamber 21 via the connection 13 and through the inner chamber 11. In the process, the combustion air is heated by contact with the hot recuperator. Fuel supplied via the fuel tube 16 burns with the heated combustion air in the combustion chamber 21. Hot or burning gases generated emerge from the opening 22 and heat the exhaust gas guide tube or radiator tube 3. Combustion gas flows through the outer chamber 9 to the exhaust gas connection 14; passing by the recuperator 8, they heat the recuperator from the outside.

The tube segment 18 provided with teeth 19 acts as a heat exchanger to transfer heat from the exhaust gas to the inflowing combustion air. The surface area available for the heat exchange is markedly increased, compared with a tube with a smooth wall, by the teeth 19 and indentations 26, which with regard to the inner chamber 11 also act as teeth. In addition, the inflowing combustion air is well mixed and overall well heated as it flows past the teeth 19 and indentations 26. The flow is disturbed by the mutually offset teeth 19 and indentations 21 in such a way as to cause an intensive thermal contact between the respective gas and the tube segment 18 of the recuperator 8. The exhaust gases flowing along the outside of the recuperator 8 are likewise brought into intensive thermal contact with the recuperator 8 and mixed thoroughly, as a result of the teeth 19 and the indentations 26. The thus-attained heat exchange between the hot combustion gases and the cool combustion air carried in a countercurrent to them is very good and is comparable to a steel recuperator tube.

The ceramic recuperator produced by the slip-casting process is provided in its heat exchanger region with a plurality of teeth extending radially inward and outward. On the otherwise hollow-cylindrical recuperator, the teeth are arranged in rings in groups; the teeth of one ring are each offset from the teeth of an adjacent ring. Alternatively, it is possible to arrange the teeth on a single- or multiple-start helical line.

I claim:

1. A recuperator for a recuperator burner, comprising
   a ceramic tube (8) having at least a portion or segment (18) whose wall is formed with protrusions and indentations to improve the heat transfer,
   wherein
   the protrusions are formed as hollow teeth (19), which are oriented radially, and in which a plurality of said hollow teeth are located in a longitudinal direction of the recuperator tube (8);
   the tooth height N, measured in radial direction for a given wall thickness S of the tube segment, is in a range of from 0.8 to 4 times the wall thickness S;
   the tooth length l, measured in the longitudinal direction of the tube portion or segment (18), is in a range of from 4 to 40 times the wall thickness S; and
   wherein
   the angle formed by two adjacent teeth (19) is in a range from 75° to 125°.

2. The recuperator of claim 1, characterized in that successive teeth (19) in the longitudinal direction of the recuperator (8) are offset from one another in the circumferential direction.

3. The recuperator of claim 1, characterized in that the tube portion or segment (18) is integrally connected to a combustion chamber (21) provided on one end thereof.

4. The recuperator of claim 1, characterized in that the recuperator (8) comprises SiC ceramic.

5. A recuperator burner (1), having at least one recuperator as claimed in claim 1.

6. A recuperator burner (1), having at least one recuperator as claimed in claim 2.

7. A recuperator burner (1), having at least one recuperator as claimed in claim 3.

8. A recuperator burner (1), having at least one recuperator as claimed in claim 4.

9. A recuperator as claimed in claim 1, wherein said ceramic tube (8) is made by slip-casting.

* * * * *